United States Patent
Vasko et al.

(10) Patent No.: US 6,909,923 B2
(45) Date of Patent: Jun. 21, 2005

(54) SAFETY COMMUNICATION ON A SINGLE BACKPLANE

(75) Inventors: David A. Vasko, Macedonia, OH (US); Joseph Lenner, Hudson, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 58 days.

(21) Appl. No.: 10/408,865

(22) Filed: Apr. 7, 2003

(65) Prior Publication Data

US 2003/0208283 A1 Nov. 6, 2003

Related U.S. Application Data

(63) Continuation-in-part of application No. 09/666,145, filed on Sep. 20, 2000, now Pat. No. 6,488,473, and a continuation-in-part of application No. 09/666,438, filed on Sep. 21, 2000, now Pat. No. 6,631,476.
(60) Provisional application No. 60/373,592, filed on Apr. 17, 2002, and provisional application No. 60/171,439, filed on Dec. 22, 1999.

(51) Int. Cl.$^7$ ............................................. G05B 9/02
(52) U.S. Cl. .............................. 700/79; 700/21; 700/9; 700/80; 700/81; 700/82; 709/224; 709/249; 710/104; 714/4; 714/7

(58) Field of Search .................... 700/9, 21, 79, 700/80, 81, 82; 709/224, 249; 714/4, 7, 10, 11; 710/104

(56) References Cited

U.S. PATENT DOCUMENTS

| | | | |
|---|---|---|---|
| 5,099,449 A | * | 3/1992 | Dombrosky et al. .......... 710/58 |
| 6,154,683 A | * | 11/2000 | Kessler et al. ............... 700/150 |
| 6,549,034 B1 | * | 4/2003 | Pietrzyk et al. ............... 326/38 |
| 6,555,935 B1 | * | 4/2003 | Maskovyak et al. ......... 307/125 |
| 6,759,767 B2 | * | 7/2004 | Maskovyak et al. ........ 307/117 |

FOREIGN PATENT DOCUMENTS

EP 000883043 A2 * 9/1998 ........... G05B/19/42

* cited by examiner

Primary Examiner—Ramesh Patel
(74) Attorney, Agent, or Firm—Quarles & Brady LLP; R. Scott Speroff

(57) ABSTRACT

Safety level error detection comparable to that provided by redundant wired safety relays is obtained on a backplane of a programmable logic controller or the like by a combination of error detection methods that in sum provide the requisite level of error detection required without necessitating a particular hardware requirement or duplicative message transmissions.

30 Claims, 13 Drawing Sheets

SAFETY COMMUNICATION ON A SINGLE BACKPLANE

CROSS-REFERENCE TO RELATED APPLICATIONS

This application claims the benefit of 60/373,592 filed Apr. 18, 2002, and is a CIP of 09/666,438 filed Sep. 21, 2000, now U.S. Pat. No. 6,631,476 which claims the benefit of 60/171,439 filed Apr. 22, 1999.

STATEMENT REGARDING FEDERALLY SPONSORED RESEARCH OR DEVELOPMENT

—

BACKGROUND OF THE INVENTION

The present invention relates to industrial controllers used for real-time control of industrial processes, and in particular to high-reliability industrial controllers appropriate for use in devices intended to protect human life and health. "High reliability" refers generally to systems that guard against the propagation of erroneous data or signals by detecting error or fault conditions and signaling their occurrence and/or entering into a predetermined fault state. High reliability systems may be distinguished from high availability systems, however, the present invention may be useful in both such systems and therefore, as used herein, high reliability should not be considered to exclude high availability systems.

Industrial controllers are special purpose computers used in controlling industrial processes. Under the direction of a stored control program, an industrial controller examines a series of inputs reflecting the status of the controlled process and changes a series of outputs controlling the industrial process. The inputs and outputs may be binary, that is, on or off, or analog, providing a value within a continuous range. The inputs may be obtained from sensors attached to the controlled equipment and the outputs may be signals to actuators on the controlled equipment.

"Safety systems" are systems intended to ensure the safety of humans working in the environment of an industrial process. Such systems may include the electronics associated with emergency stop buttons, interlock switches, and machine lockouts. Traditionally, safety systems have been implemented by a set of circuits wholly separate from the industrial control system used to control the industrial process with which the safety system is associated. Such safety systems are "hard-wired" from switches and relays, some of which may be specialized "safety relays" allowing comparison of redundant signals and providing internal checking of conditions such as welded or stuck contacts. A hallmark of such safety systems is the use of at least two redundant wire sets, each carrying the same signals so that the signals on the wires may be compared to ensure that one signal was not lost or corrupted. In this regard, safety systems may use switches with dual contacts and actuators that are wired to engage only if multiple uncorrupted signals are received.

Hard-wired safety systems using duplicated wiring have proven cumbersome as the complexity of industrial processes has increased. This is in part because of the cost of installing the components and redundant wiring and in part because of the difficulty of troubleshooting and maintaining the "program" implemented by the safety system in which the logic can only be changed by rewiring physical relays and switches.

For this reason, there is considerable interest in implementing safety systems using industrial controllers. Such controllers are easier to program and have reduced installation costs because of their use of a high-speed serial communication network eliminating long runs of point-to-point wiring.

Standard protocols for high-speed serial communication networks commonly used in industrial control are not sufficiently reliable for safety systems. For this reason, efforts have been undertaken to develop a "safety network protocol" for high-speed serial communication providing greater certainty in the transmission of data. Unfortunately, if these new safety network protocols are adopted, existing industrial controller hardware (e.g., network interface cards implementing standard network protocols) may be unusable, imposing high costs on existing and new factories. Such costs may detrimentally postpone wide scale adoption of advanced safety technology.

One solution to this problem is described in pending U.S. application Ser. No. 09/666,438 filed Sep. 21, 2000, now U.S. Pat. No. 6,631,476 and entitled "Safety Network for Industrial Controller Providing Redundant Connections on Single Media", assigned to the same assignee as the present invention and hereby incorporated by reference, in which a safety network protocol is described that may be "encapsulated" in a standard network protocol, allowing standard networks and network hardware to be used. In such a safety network, duplicate messages are transmitted to imitate the duplicate wiring used in a standard "hard-wired" safety system, providing two paths of data communication. The software implementation of redundant physical wiring is both less costly and more flexible.

The implementation of a safety network on a backplane of the industrial controller as an extension to a network is described further in U.S. application Ser. No. 10/034,387 filed Dec. 27, 2001, now U.S. Pat. No. 6,549,034 entitled "Programmable Logic Controller for Safety Systems With Reduced Cross-Wiring" also assigned to the same assignee as the present invention and hereby incorporated by reference. In both of these safety network protocol systems, multiple "connected" messages serve as a replacement to separate physical wires used to carry redundant safety information, while allowing flexible reconfiguration without the need for actual rewiring of the safety system.

BRIEF SUMMARY OF THE INVENTION

The present inventor has recognized that a safety protocol using a standard network or backplane can provide safety operation with a wide variety of error detection protocols whose error detection abilities can be traded off against each other to provide the desired level of error detection.

This ability to mix and match error detection methods allows, for example, redundant information in a safety system to be transmitted with a single message much simplifying the design of a programmable logic controller intended to be assembled out of a variety of modular components that must interoperate. This ability to use a single message, in part, recognizes that the network integrity advantages gained by independent wiring can be realized through other message integrity enhancing steps. In part, this ability to use a single message also recognizes that redundant messages provide an increase in availability of the network that is independent of and unessential to safety.

Specifically, in one embodiment, the present invention provides a backplane system for interconnecting components of an industrial controller for safety operation comprising and having an input component providing redundant input signals on a first and second dedicated wire conductor and an output component receiving redundant output signals on a first and second dedicated wire conductor. A backplane is provided having at least one conductor for conducting data as digital messages and at least two industrial controller components having connectors allowing connection of the industrial components to the conductor of the backplane and having terminals connectable to receive the redundant signals of the input and output devices on the dedicated wire conductors and to communicate between the input and output devices using at least one message for each set of redundant signals. A safety protocol means enforces a communications protocol over messages communicated over the backplane among industrial controller components to provide an error rate in the transmission of messages between the input device and output device using the backplane no greater than the error rate obtained by direct connection of the dedicated wire conductors of the input and output components directly between the input and output components.

Thus it is one object of the invention to provide a protocol-based rather than hardware-based safety system.

The industrial controller components may communicate between the input and output devices using only one message for each set of redundant signals.

Thus, it is another object of the invention to provide the benefits of redundant signals in reducing errors without the need for the complexity of redundant digital messages on the backplane.

More generally, the invention allows an arbitrary level of safety to be obtained by combining a variety of techniques. That is, the invention provides a backplane system for interconnecting components of an industrial controller for safety operation made up of a backplane having at least one conductor for conducting data as digital messages and at least two industrial controller components having connectors allowing connection of the industrial components to the conductor of the backplane for the communication of messages thereon. A safety protocol mechanism which may be implemented in software or hardware, enforces a communications protocol on messages communicated over the backplane among industrial controller components to provide an error indication upon any of: (i) loss of a message transmitted from one component to a second component; (ii) corruption of a message transmitted from one component to a second component; and; (iii) misdirection of a message transmitted from one component, intended for a second component, to a third component. When any predetermined combination of these error indications occurs, the safety protocol means places the industrial controller in a predetermined safety state.

Thus, it is an object of the invention to provide safety system error detection using a variety of different protocols suitable for implementation on a backplane independent of specific hardware.

The safety protocol may further provide an indication of (iv) repetition of a message previously transmitted from one component to a second component; (v) insertion of a message not transmitted from any component to a second component; and (vi) a change in sequence of multiple messages transmitted from a first component before receipt by a second component.

Thus, it is another object of the invention to address a secondary source of errors whose detection can contribute to the necessary overall error detecting level required.

The foregoing and other objects and advantages of the invention will appear from the following description. In the description, reference is made to the accompanying drawings which form a part hereof, and in which there is shown by way of illustration, a preferred embodiment of the invention. Such embodiment does not necessarily represent the full scope of the invention, however, and reference must be made to the claims herein for interpreting the scope of the invention.

DETAILED DESCRIPTION OF THE INVENTION

The present invention can be part of a "safety system" used to protect human life and limb in the industrial environment. Nevertheless, the term "safety" as used herein is not a representation that the present invention will make an industrial process safe or that other systems will produce unsafe operation. Safety in an industrial process depends on a wide variety of factors outside of the scope of the present invention including: design of the safety system, installation, and maintenance of the components of the safety system, and the cooperation and training of individuals using the safety system. Although the present invention is intended to be highly reliable, all physical systems are susceptible to failure and provision must be made for such failure.

Figure 1:
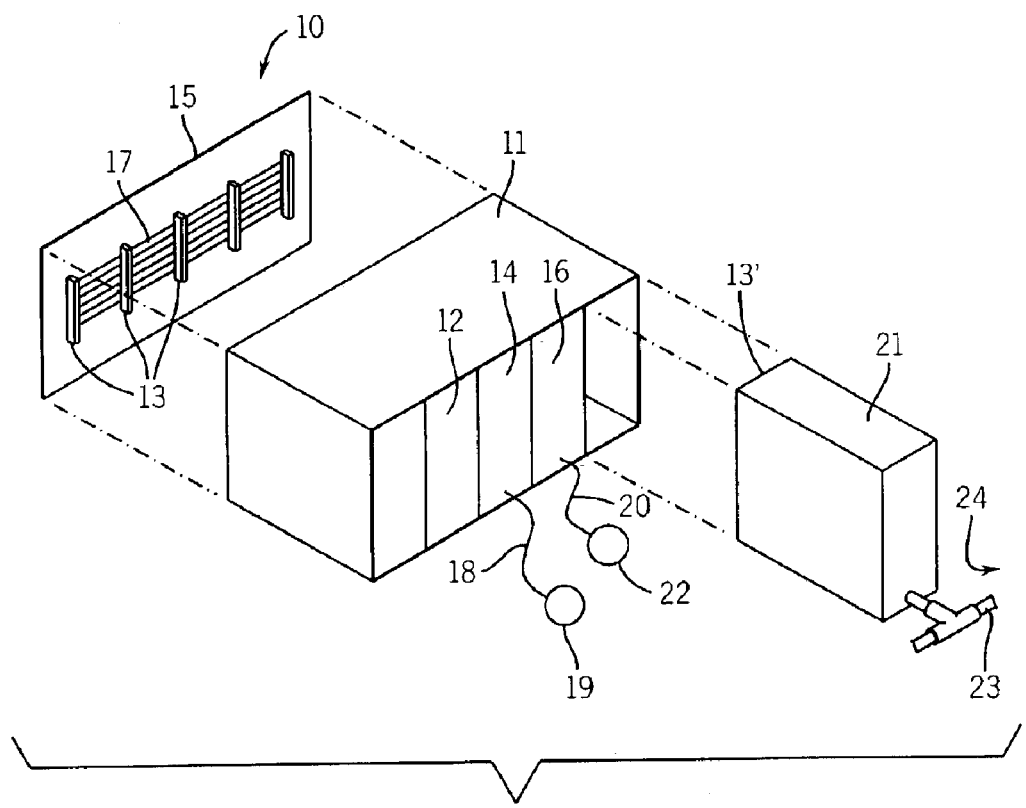
FIG. 1 is a perspective view of a simplified industrial controller using a standard communication protocol on a backplane linking a central controller with input and output circuits and with a remote configuration terminal, such as may be used in the present invention.

Referring now to FIG. 1, an industrial control system 10 for implementing a safety system with the present invention includes a chassis 11 holding a controller module 12 communicating on a backplane 15 of the chassis 11 with an input module 14 and an output module 16. Alternatively, the backplane 15 may be a serial network communicating with remote components according to methods well known in the art. The backplane 15 may include multiple parallel traces 17 or a single serial trace joining a number of electrical connectors 13 which may connect to corresponding connectors 13' on the backs of the modules 12, 14, and 16. The backplane 15 may thus accommodate the connected messaging described below. Although electrical communication for networks or backplanes is common, fiber-optic and wireless communications technologies may also provide the basis for the backplane of the present invention.

The backplane 15 may use a standard and commonly available high-speed serial protocol including but not limited to: Ethernet, DeviceNet, ControlNet, Firewire or FieldBus. The backplane 15 may optionally connect to a bridge 21 translating between different of the above standards or other protocols on a serial network 23. As will be understood from the following, the present invention may be easily adapted to bridge applications.

Input module 14 may accept input signals 18 (on like-designated lines) which are communicated over the backplane 15 to the industrial controller 12. At the industrial controller 12, the signals 18 may be processed under a control program implementing a safety system (such as a machine lock-out or emergency stop) and further signals sent to the output module 16 which may produce output signals 20 (on like-designated lines) to an actuator 22.

The input signals 18 may come from a switch 19 which may be any of a variety of devices producing safety input signals including but not limited to emergency stop switches, interlock switches, light curtains and other proximity detectors. The actuator 22 may be a relay, solenoid, motor, enunciator, lamp, or other device implementing a safety function.

Also connected to the backplane 15 is a standard computer, which may be used as a configuration terminal 24 (not shown) whose purposes will be described below.

Redundant System Hardware

Figure 2:
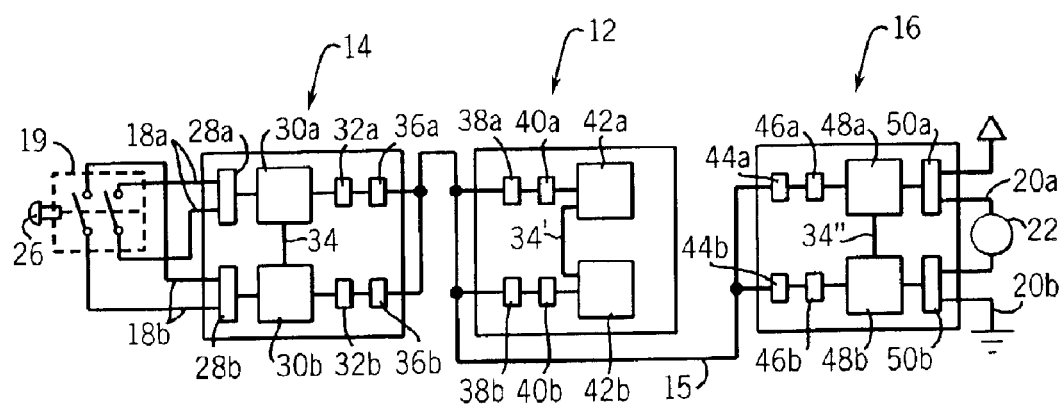
FIG. 2 is a schematic block diagram of the control system of FIG. 1 showing redundant wiring from an input switch to the input circuit of FIG. 1, the input circuits having redundant components such as may process the signals from the input switch to send signals over the backplane to the controller of FIG. 1, the controller having redundant processors to send signals over the backplane to the output circuit of FIG. 1, the output circuit having redundant components to provide outputs to an actuator.

Referring now to FIG. 2, the switch 19 may produce redundant signals 18a and 18b where signal 18a is, for example, from a first contact within the switch 19, and signal 18b is from a second independent contact within switch 19. The contacts may have the same logic (as shown) both being normally open (e.g., closed with actuation of a pushbutton 26) or may be inverted logic with one contact normally open and one contact normally closed. In either case, redundant signals 18a and 18b are generated so as to provide for higher reliability in determining the state of the switch 19.

The input module 14 may include redundant interface circuitry 28a receiving signal 18a and interface circuitry 28b receiving signal 18b. Alternatively, but not shown, interface circuitry 28a and 28b may each receive both signals 18a and 18b (for internal comparison) or may receive signals 18a and 18b from a single contact. The contacts, in generating signals 18a and 18b, may each be provided with a separate voltage from the input circuitry 28a and 28b or from a common voltage source (not shown). Other redundant variations on these wiring systems, known in the art, may also be used.

Each of the interface circuitry 28a and 28b may in turn provide signals to associated microcontrollers 30a and 30b. Microcontrollers 30a and 30b provide a computer processor, memory and a stored program for executing safety protocol programs as will be described below. Alternatively, or in addition, the safety protocol may be executed by safety protocol circuits 32 with which microcontrollers 30a and 30b communicate. In this case, the safety protocol circuits 32a and 32b may be application-specific integrated circuits (ASIC). As it is well known in the art to implement protocols through hardware or software or combinations of each, the term "protocol device" as used herein and in the claims should be understood to embrace generally any combination of software and hardware components implementing the indicated functions.

The microcontrollers 30a and 30b may communicate with each other through an internal bus 34 to compare signals 18a and 18b as will be described.

Microcontrollers 30a and 30b or safety protocol circuits 28a and 28b in turn connect to standard network protocol circuits 36a and 36b of a type well known in the art for handling the low level protocol of the standard backplane 15. Typically, the standard network protocol circuits 36a and 36b are implemented by an ASIC whose implementation represents considerable development time and which cannot be easily modified. The standard network protocol circuits 36a and 36b transmits signals from the input module 14 on the backplane 15 to be received at the controller 12 through similar standard network protocol circuits 38a and 38b.

Alternatively, the input module 14 may include redundant interface circuitry 28a and 28b receiving signals 18a and 18b connected by a bus to a single associated microcontroller 30a which may implement the safety protocol in software and connect to a single standard network protocol circuit 36a according to conventional input module architecture. The critical factor is that the non-redundant hardware provides a sufficient level of integrity. In the case where multiple messages are transmitted, these messages are processed by the standard network protocol circuit 38 and provided to redundant safety protocol circuits 40a and 40b, being similar to safety protocol circuits 32a and 32b described before. These safety protocol circuits 40a and 40b communicate with processors 42a and 42b, respectively, which include separate memory systems and control programs according to well-known redundancy techniques and which intercommunicate on internal bus 34'. Output signals generated by the processors 42a and 42b may be communicated back through the safety protocol circuits 40a and 40b to implement the safety protocol, as will be described below (or alternatively, the safety protocol may be handled by the processor 42a and 42b), and the output signals communicated to the standard network protocol circuits 38a and 38b for transmission again on backplane 15 to output module 16.

In the case where a single message is transmitted, this message is processed by the standard network protocol circuit 38 and may be provided, in one variation, directly to a single processor 42a which generates an output signal communicated back through the standard network protocol circuits 38a for transmission again on backplane 15 to output module 16. The safety protocol may be handled directly by the processor 42a. The other components, such as processor 42b are omitted. When redundant messages are used, output module 16 may receive output data through a standard network protocol circuits 44a and 44b being similar to standard network protocol circuits 36a and 36b and 38a and 38b. The standard network protocol circuits 44a and 44b provide the data to safety protocol circuits 46a and 46b, which in turn provide them to redundant controllers 48a and 48b. As before, alternatively, the safety protocol may be handled by the controllers 48a and 48b instead. The controllers 48a and 48b communicate by internal bus 34" and in turn provide signals to output interface circuits 50a and 50b which provide the output signals 20a and 20b. The output signals may be connected to the actuator 22 so that outputs must be enabled for the actuator 22 to be powered. In this sense, a default safety state is produced (of no power to the actuator 22) if there is an inconsistency between the signals received by processors 48a and 48b. A change in the wiring to parallel configurations could create a safety state where the actuator is actuated unless both signals received by processors 48a and 48b are not enabled.

Alternatively, and as will be described, a safety state may be enforced by a safety state signal transmitted from the controller 12 or the input module 14 to the microcontrollers 48a and 48b of output module 16, the latter which may respond by producing outputs to output interface circuits 50a and 50b determined by stored values of desired safety states programmed through the configuration terminal 24 as will be described further below.

When a single message is processed along the backplane 15, output module 16 may receive output data through a single standard network protocol circuit 44a and provide it directly to controller 48a and, the safety protocol may be handled by the controllers 48a. The controller 48a may in turn provide two signals to output interface circuits 50a and 50b which provide the output signals 20a and 20b.

A bridge circuit 17 per the present invention could use the basic structure shown in the input module 14 but replacing the interface circuitry 28a and 28b of input module 14 with network protocol circuits 38a and 38b and safety protocol circuits of 40a and 40b (where the network protocol circuits 38 and 36 are for different protocols, thereby allowing seamless transmission of safety data per the techniques described below).

Alternatively, when a single message is employed, the bridge circuit 17 could use a single network protocol circuit for one network, communicating directly through a single processor to a second single network protocol circuit for the second network in the manner of standard bridge circuits.

An alternative embodiment contemplated by the present invention allows direct communication between the input module 14 and the output module 16 without the intervening controller 12 or for systems without controllers 12. In this case, network protocol circuits 36 (or single network protocol circuit 36) communicate directly with network protocol circuits 44 (or single network protocol circuit 44).

Figure 3:
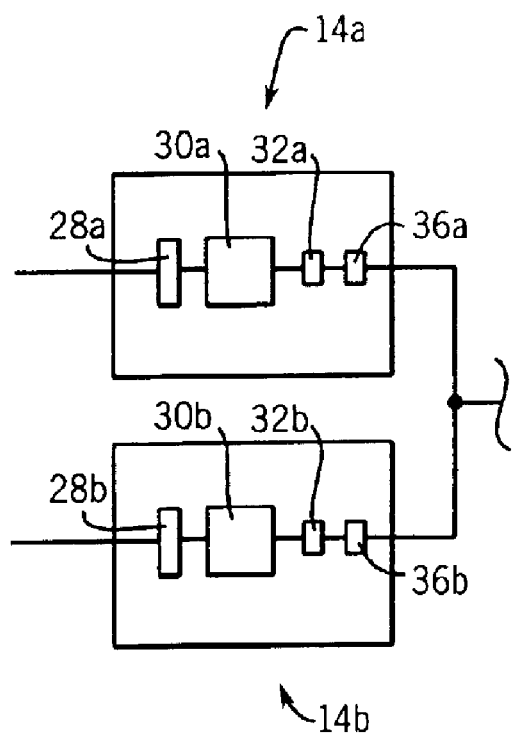
FIG. 3 is a fragmentary view similar to FIG. 2 showing an alternative configuration of the input circuit of FIG. 2 using conventional control input circuits without redundant components.

Referring now to FIG. 3, specialized redundant input module 14, in the present invention, may be replaced with two standard input modules 14a and 14b, input module 14a holding the equivalent of previously described interface circuitry 28a, microcontroller 30a, safety protocol circuit 32a and standard network protocol circuit 36a, and input module 14b holding the equivalent of interface circuitry 28b, microcontroller 30b, safety protocol circuit 32b, and standard network protocol circuit 36b. In this case, the operation of safety protocol circuits 32a and 32b are implemented in the firmware of the microcontrollers 30a and 30b and effected via messages communicated on the backplane 15 rather than the internal bus 34. Or when a single message is used, a specialized redundant input module 14 may be replaced with one standard input module 14a.

Figure 4:
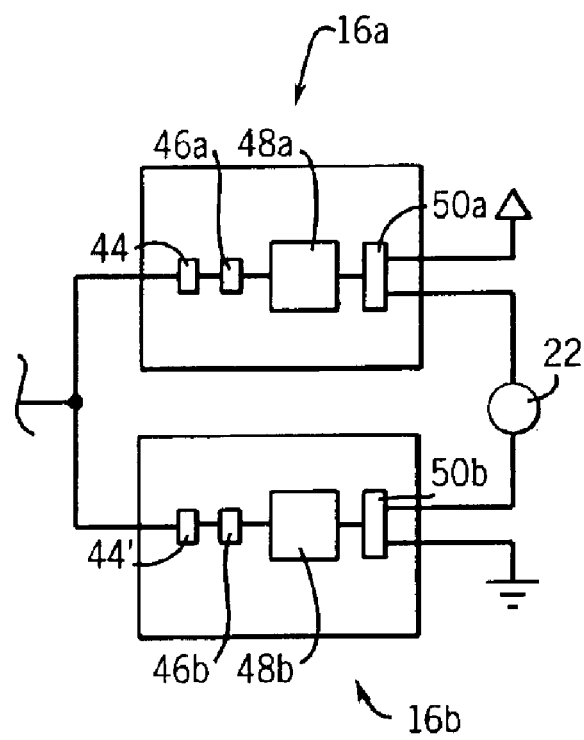
FIG. 4 is a fragmentary view similar to FIG. 2 showing an alternative configuration of the output circuit of FIG. 2 using conventional control output circuits without redundant components.

Likewise, referring to FIG. 4, the redundancy of output module 16 may be implemented by separate output circuits 16a and 16b, output module 16a including the equivalent of standard network protocol circuit 44, safety protocol circuit 46a, microcontroller 48a, and output interface circuit 50a, with output module 16b including the equivalents of standard network protocol circuit 44 as 44', safety protocol circuit 46b, microcontroller 48b, and output interface circuit 50b. Or when a single message is used, a specialized redundant output module 16 may be replaced with one standard output module 16a.

As will be described below, the present invention provides a protocol that is indifferent to the exact parsing of the safety components among physical devices having addresses on the backplane 15.

Figure 5:
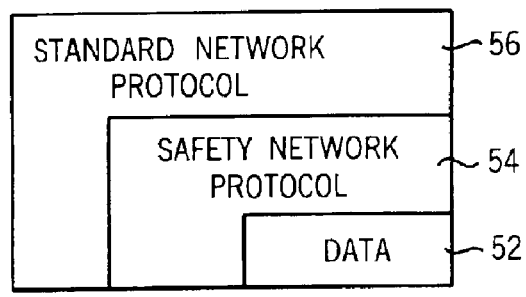
FIG. 5 is a representational view of the dual communication protocols provided by the present invention in which data is first encoded with a safety protocol and then with a network protocol to be compatible with the backplane.

Referring now to FIGS. 5 and 2, the operation of the safety protocol circuits 32 (or their software implementation) and standard network protocol circuits 36 in the input circuit 14 is to embed input data 52 from lines 18b within a safety-network protocol 54 implemented both as additional data attached to messages sent on backplane 15 and in the management of that data as will be described. The safety-network protocol 54 is in turn encapsulated in the standard network protocol 56 for seamless transmission on the backplane 15.

The Safety Network Protocol

Referring now to FIGS. 5 and 2, the operation of the safety protocol circuits 32, 40 and 46 (or software implementations as will henceforth be understood without further repetition) in conjunction with the standard network protocol circuits 36, 38 and 44 for any of these embodiments is to embed safety data 52 (e.g., from lines 18b) within a safety-network protocol 54 implemented both as additional data attached to safety data 52 sent on backplane 15 and in the management of the particulars of transmission of that safety data 52. The safety-network protocol 54 is in turn encapsulated in the standard network protocol 56 for seamless transmission on the backplane 15.

The data encapsulated in the safety-network protocol 54 and standard network protocol 56 can then be received (e.g., by the controller 12) and extracted through the successive operation of the standard network protocol circuits 36, 38 and 44 and the safety protocol circuits 32, 40 and 46 to provide the safety data 52 in its basic state. Note that FIG. 5 is only symbolic of the process and that the safety-network protocol 54 is not simply an encapsulation of the data 52 within, for example, safety data headers but rather the safety protocol includes timing constraints that may be executed in sequence with the standard network protocol 56 so that the safety-network protocol 54 may operate within the standard network protocol 56 without modification of the backplane 15 or standard network protocol circuits 36, 38 and 44.

This dual level encapsulation and de-encapsulation is performed for each transmission of safety data 52 on the backplane 15 that requires a high level of reliability commensurate with safety systems. For non-safety system data, the standard network protocol 56 may be used alone without the safety-network protocol 54 for communication with non-safety elements of the industrial control system 10. Because all data transmitted on the backplane 15 is embedded in the standard network protocol 56, the safety-network protocol 54 will work seamlessly with a variety of networks 15 providing they have data transmission capacity suitable for the safety data 52 and sufficient capacity to accept some added safety error detection data 58 of the safety-network protocol 54 as will be described.

Safety Message Formatting

Generally, the safety protocol may provide a variety of different mechanisms for ensuring that data transmitted is free from undetected errors. A standard for undetected error rate desirably achieved by the invention is less than $10^{-7}$ undetected errors per hour or less than $10^{-3}$ undetected errors per demand. The particular types of errors and the particular methods of detecting these errors may be varied so long as the reliability of the transmitted data on the bridge/backplane matches that of a theoretical hardwired safety system or the error rate demanded by applicable regulations.

Among the communication errors that may be detected are: (1) message repetition, (2) message loss including message delay, (3) message insertion, (4) incorrect message sequence, (5) message corruption, and (6) message misdirection. The mechanisms used to detect these errors may include: (a) time stamping the messages, (b) sending messages on a regular schedule and applying a watchdog timer to message receipt, (c) positive identification of the sender and the receiver incorporated into the messages, (d) cyclic redundancy coding (CRC) or other error correction codes embedded in the message including the sending of the compliment of the message, (e) sending of the message multiple times, (f) echoing the message back from the receiver, and (g) the use of a message sequence number. These mechanisms make up the safety message protocol.

Message repetition may be caused by operation of a bridge and is not necessarily an error because the I/O circuitry may allow overwriting of data. However, a repeated message will not have an updated timestamp because only the original producer can update the timestamp and thus may register as an error.

Message loss is from messages that are never received or those that are received later than the time required. Messages received early are not treated as errors. Message delays are the receipt of the message beyond an expected time interval and are a special case of message loss.

Message insertion is an extra message otherwise unaccounted for. It may be detected by an unexpected value of the timestamp or a unique identification of sender and receiver described below (if it is the result of a fault in addressing).

Incorrect sequence is caused by messages changing in relative order between the time they are transmitted and the time they are received as may result from network delays. Such messages may be detected by their unexpected timestamps.

Message corruption results from the changing of one or more message bits in the message (such as may be caused by interference or hardware problems) during transmission and may be detected by error correcting code, as will be described below, and by sending the complement of the original data together with the original data.

Misdirected messages are messages that go to the wrong address. These produce other detectable errors such as message lost, message insertion, message repetition, timestamp errors, and message delay.

Figure 6:
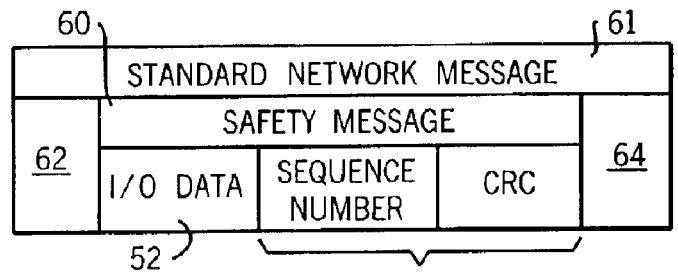
FIG. 6 is a schematic representation of a data word transmitted over the backplane showing the embedding of safety formatting data with I/O data within the formatting provided by the backplane.

Referring now to FIG. 6, a first aspect of the safety-network protocol 54 is that the safety data 52 (typically I/O data related to a safety application) is attached to safety error detection data 58 to form a safety message 60 that forms the data provided to the standard network protocol circuits 36, 38 and 44 to produce a network message 61. The safety error detection data 58 may include a time stamp (not shown) indicating the time of transmission of the safety data 52 and a sequence count indicating the local order in which the safety message 60 is transmitted with respect to earlier transmissions of safety messages. The sequence count is normally limited in range (0–3) as it is intended to detect the loss of only a single message.

Also appended to the safety data 52 and part of the safety error detection data 58 is a cyclic redundancy code (CRC) selected in the preferred embodiment to be eight to 16 bits depending on the size of the message. The cyclic redundancy code is functionally generated from the safety data 52 so that an error in the transmission can be detected when the CRC is recalculated by the receiving device and doesn't match. A separate CRC may be used for the other parameters of the message, for example, the time stamp and sequence number of the safety error detection data 58.

The safety data 52 may be attached to complementary safety data (not shown) in the same safety message 60, the complementary safety data having each "1" of the safety data 52 replaced by a "0" and vice versa. A separate CRC is provided for this complementary safety data. The complementary data helps detect low-level hardware errors such as "stuck bits" in buffers and the like. Additional mode and timing data may be attached to the message 60 to indicate its state as single-cast or multicast message, various fault states, and/or to provide a ping counter to be used to measure network delays.

Safety message 60 is embedded in the network headers and footers 62 and 64, which vary depending on the standard network protocol 56 of the backplane 15. Depending on the backplane 15, the network header and footer 62 and 64 may include a CRC code and sequence count and other similar safety error detection data 58 operating redundantly with the safety error detection data 58. Nevertheless, the safety message 60 includes its own safety error detection data 58 to be wholly network-independent to the degree possible.

The above features allow detection of (1) message repetition, (2) message loss, (3) message insertion, (4) incorrect message sequence and, (5) message corruption as will be described below.

Connected Messaging

Figure 9:
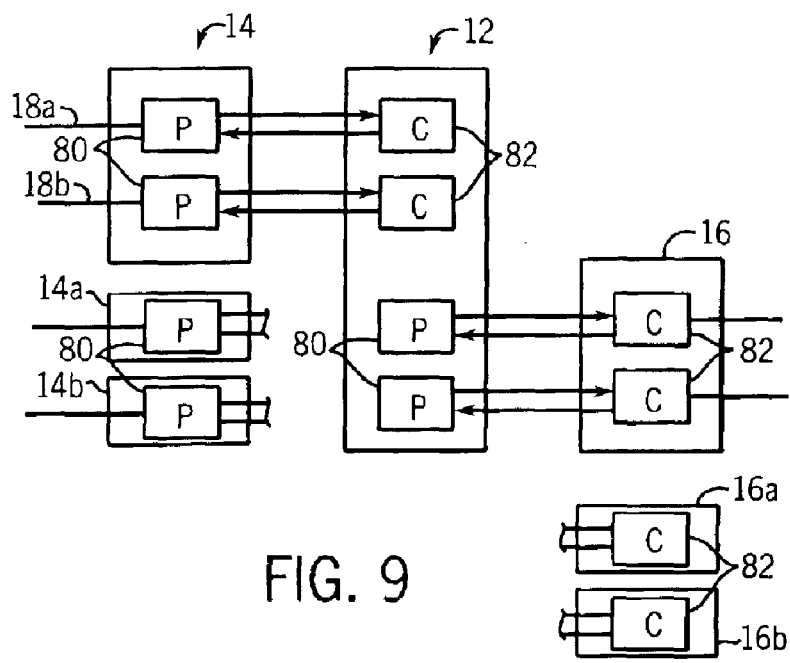
FIG. 9 is a block diagram of the industrial controller of FIG. 1 showing, in one embodiment, the division of communications between the input circuit, the controller and the output circuit into producer-consumer pairs such as provides redundant communication over a single network and the varied topologies of the implementations of FIGS. 2, 3 and 4.

As mentioned above, the safety error detection data 58 forms only part of the safety-network protocol 54. The safety-network protocol 54 also includes a configuration step that ensures proper communication under a connected messaging scheme. Referring now to FIG. 9, the communications between the controller 12, input module 14 (or input modules 14a and 14b) and, the output module 16 (or output module 16a and 16b) may provide a connected messaging system. As is understood in the art, connected messaging involves opening a connection between pairs of logical devices, one that acts as a "producers" of a message and, one that acts as a "consumers" of the message. The process of opening the connection reserves bandwidth of the network and reserves necessary processing and buffering resources at the producer and consumer to ensure that data of the connection will be reliably transmitted and received.

The connected messaging protocol may be implemented as part of the safety network protocol 54 or as part of the standard network protocol 56, the latter option limiting somewhat the types of standard networks 15 that may be used. Some standard network protocols that support connected messaging are DeviceNet and ControlNet, Ethernet, and ATM.

Referring now to FIG. 9, under a connected messaging protocol, and in a first embodiment using redundant messaging, the input module 14 provides two producers 80 opening two connections with two consumers 82 of the controller 12, one for each of the signals 18a and 18b. As a practical matter, these two connections mean that two separate network messages 61 will be sent over the backplane 15 thus decreasing the chance of loss of both messages.

For the implementation of FIG. 3 with separate input module 14a and 14b, two producers 80 are also provided. Even though the producers 80 are now in different devices (having different addresses on the backplane 15), the operation of the control program implementing the safety system, above the connection level, need not changed by these changes in implementations. Connected messaging thus makes the safety system largely indifferent to topologies as providing for a natural redundancy over a single network, or multiple links.

Controller 12 likewise includes two producers 80 exchanging data with consumers 82 either in a single output module 16 per FIG. 2 or in separate output module 16a and 16b per the embodiment of FIG. 4. Two arrows are shown between each producer 80 and consumer 82 indicating the paring of each message with an acknowledgment message under the safety protocol 54 as will be described below, per FIG. 9.

The bridge circuit 17, not shown in FIG. 9, but as described above, would implement four consumers and four producers (two for each network side) as will be understood to those of ordinary skill in the art.

Alternatively, the input module 14 may provide one producer 80 opening one connection with one consumer 82 of the controller 12, for a single highly reliable signal 18a so that only one network message is sent for each input signal. Controller 12 likewise may include a single producer 80 exchanging data with a single consumer 82 for each of the output signals. This approach greatly simplifies implementation of the safety system.

Safety Configuration Data and Protocol

Figure 10:
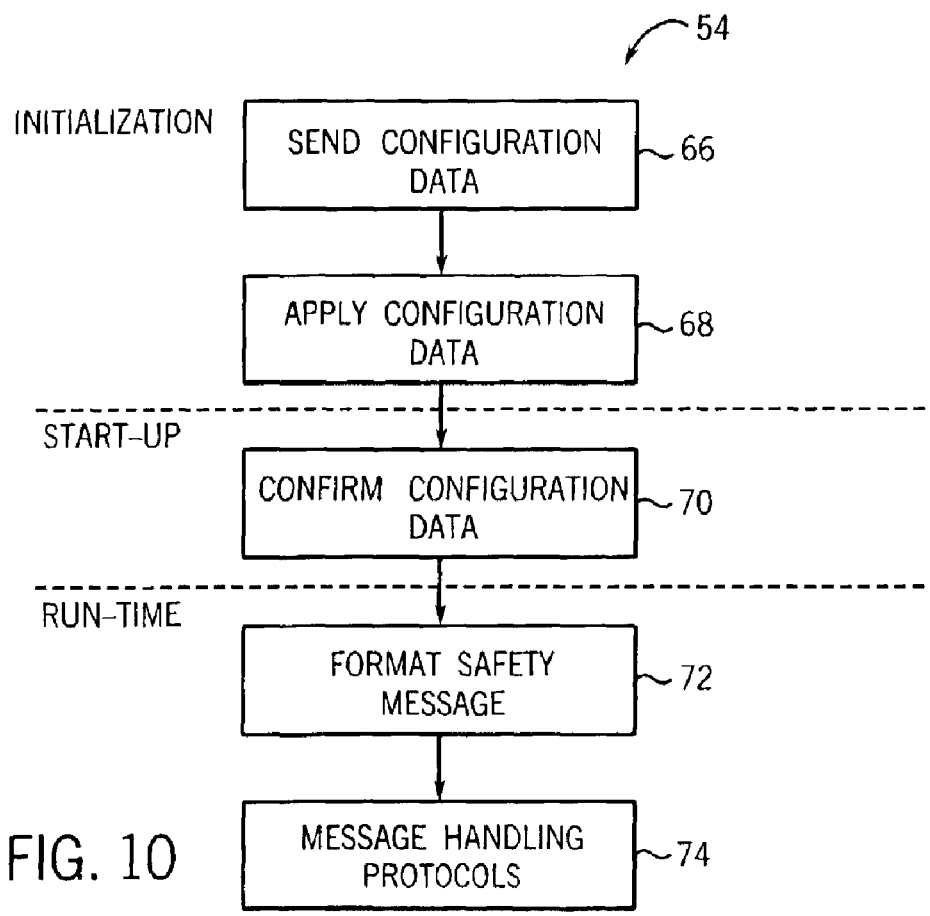
FIG. 10 is a flow chart showing the principle stages of the safety protocol of initialization, start-up, and run-time.

Referring now to FIG. 10, the safety protocol more generally includes an initialization state of which the first step is developing configuration data as indicated by process block 66.

The configuration process involves developing configuration data at the configuration terminal 24 and ensuring that accurate copies of that configuration data are at each of the input module 14, the controller 12, and the output module 16. The configuration data is unique to each connection, provides essential components of the safety protocol, and identifies intercommunicating parties to reduce the possibility of improper connections injecting spurious data into the safety system (message misdirection). This is particularly important in allowing mixing of systems components observing the safety network protocol 54 with standard components observing only the standard network protocol. Devices may support multiple connections in which case multiple configuration data specific to each connection will be used.

Generally, the configuration data include data (i.e., a Safety Configuration Consistency Value (SCCV)) uniquely identifying the particular device of the input module 14, the controller 12, and the output module 16 holding the configuration data, and particularly the serial number of that device. The serial number is a unique and immutable part of the physical devices and thus together with an internal address of the logical devices within the physical device (which may establish independent connections), the serial number provides each connection with a unique identity eliminating the possibility of crossed connections between different devices once the configuration data is properly disseminated. To augment the serial number, the configuration data may also include a vendor identification number, a device code, a product code, major revision, minor revision, as well as network data including the logical, physical address of the device, all known in the art and identifying the particular device. Similarly, the configuration data within a device may include the serial number of the device to which it is connected.

As mentioned, the connection data may also include data necessary for the implementation of the other aspects of the safety protocol as are yet to be described, including variables of "periodic time interval", "reply timer interval", "filter count", and "retry limit". The configuration data also includes the safety state to which the device will revert in the case of network error and a list of related I/O points indicating other I/O points (related to other connections), which should revert to the safety state if the present connection has an error. This later feature allows selective and intelligent disabling of the safety system upon a communication error as will be described. As will be evident from context, some of this data is dependent on the devices and the system programmer must develop some.

Figure 7:
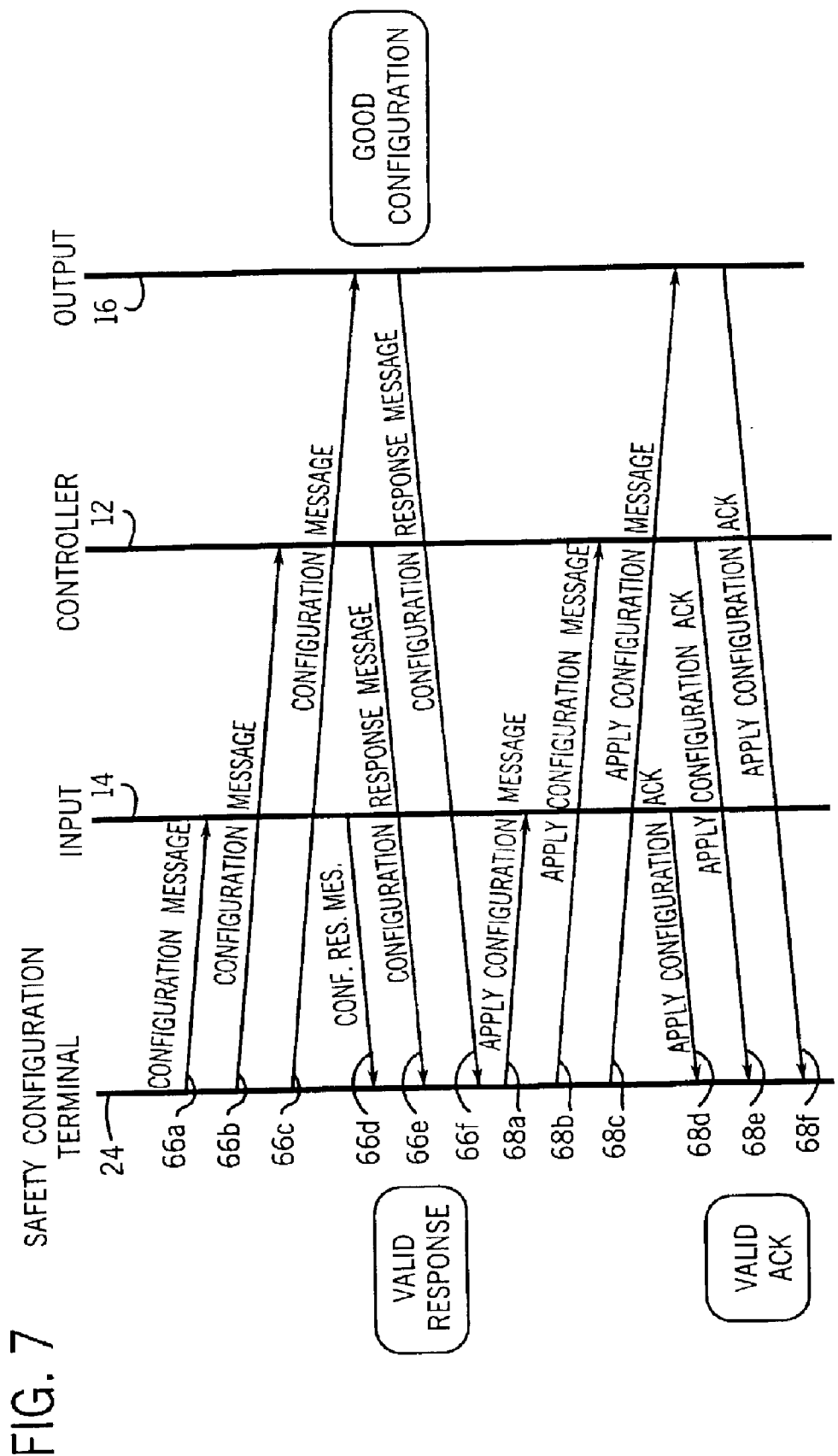
FIG. 7 is a graphical representation having time on the vertical axis and distance along the network on the horizontal axis showing transmission of configuration messages to the input circuit, the controller, and the output circuit, forming the one step of the safety protocol of the present invention.

Referring to FIG. 7, configuration data held within the configuration terminal 24 is sent to each of the input module 14, the controller 12, and the output module 16 as messages 66a, 66b and 66c.

The receiving input module 14, the controller 12, and the output module 16 store the configuration and respond with the same configuration message. If the configurations of messages 66a, 66b and 66c exactly match configuration data of messages 66d, 66e and 66f, the configuration was successful.

The configuration data may be shown to a human operator for confirmation. If the operator finds that the configuration is correct, the configuration is applied as indicated by process 68 shown in FIG. 10 through messages 68a, 68b and 68c from the configuration terminal 24 to the respective input module 14, the controller 12, and the output module 16. The devices must acknowledge these messages via messages 68d, 68e and 68f within a predetermined time interval or the configuration will be cleared and no configuration will be considered to have occurred. The configuration data of messages 66 and 68 may be sent using only the standard network protocol 56.

Figure 8:
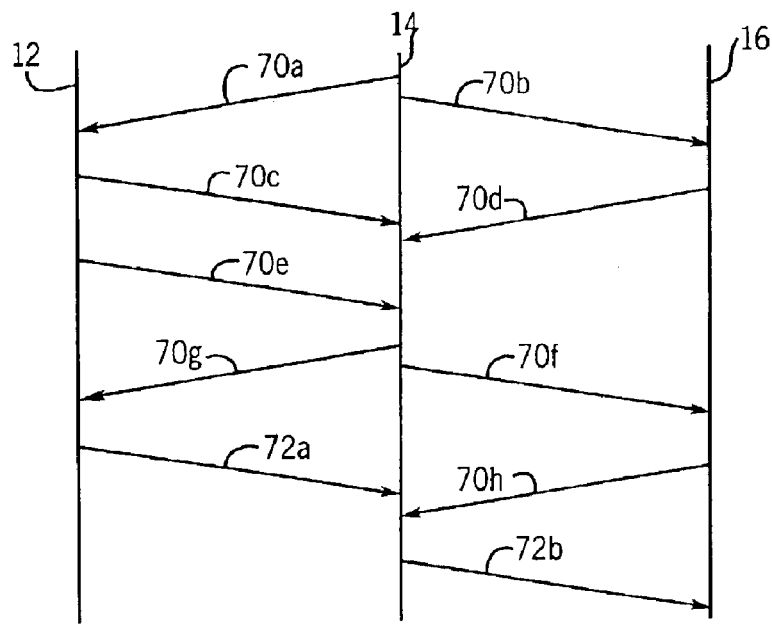
FIG. 8 is a figure similar to that of FIG. 7 showing the transmission of messages after the configuration process of FIG. 7 during a start-up and run-time phase of the network.

Once the configuration is complete, the safety protocol enters a start-up phase shown generally in FIGS. 8 and 10. During the start-up phase, the necessary safety connections are established and the configuration data is used to verify that the connections expected are those which are in fact made. The purpose of the startup portion of the configuration is to prevent erroneous connections from being opened between: (1) devices in the safety system and other erroneous devices in the safety system, and (2) devices in the safety system and other devices not in the safety system in a mixed system.

In this start-up process indicated by process block 70 of FIG. 10, the connections are confirmed from the controller 12 to the input module 14 and the output module 16. In particular, the producers 80 in controller 12 (shown in FIG. 9) send out open connection messages 70a and 70b to the input module 14 and the output module 16, respectively. The appropriate consumers 82 respond with connection acknowledgment message 70c and 70d, respectively. The producers 80 in controller 12 and input module 14 then send the configuration data to the consumer 82 in the controller 12 as indicated by messages 70e and 70f. The controller's consumers 82 check to see that the configuration data matches their configuration data and then send acknowledgment messages 70f and 70g acknowledging that match. At messages 72a and 72b, conventional I/O data may then commence to be sent.

Referring again to FIG. 10, the data 72a and 72b will be transmitted according to the portions of the safety protocol indicated by process blocks 72 involving formation of the safety message 60 incorporating safety error detection data 58 into the network message 61 as has been described above, and according to message handling protocols 74 operating independent of and in conjunction with the content of the safety message 60 which will now be discussed.

Message Handling Safety Protocols (1) Normal Transmission

Figure 11:
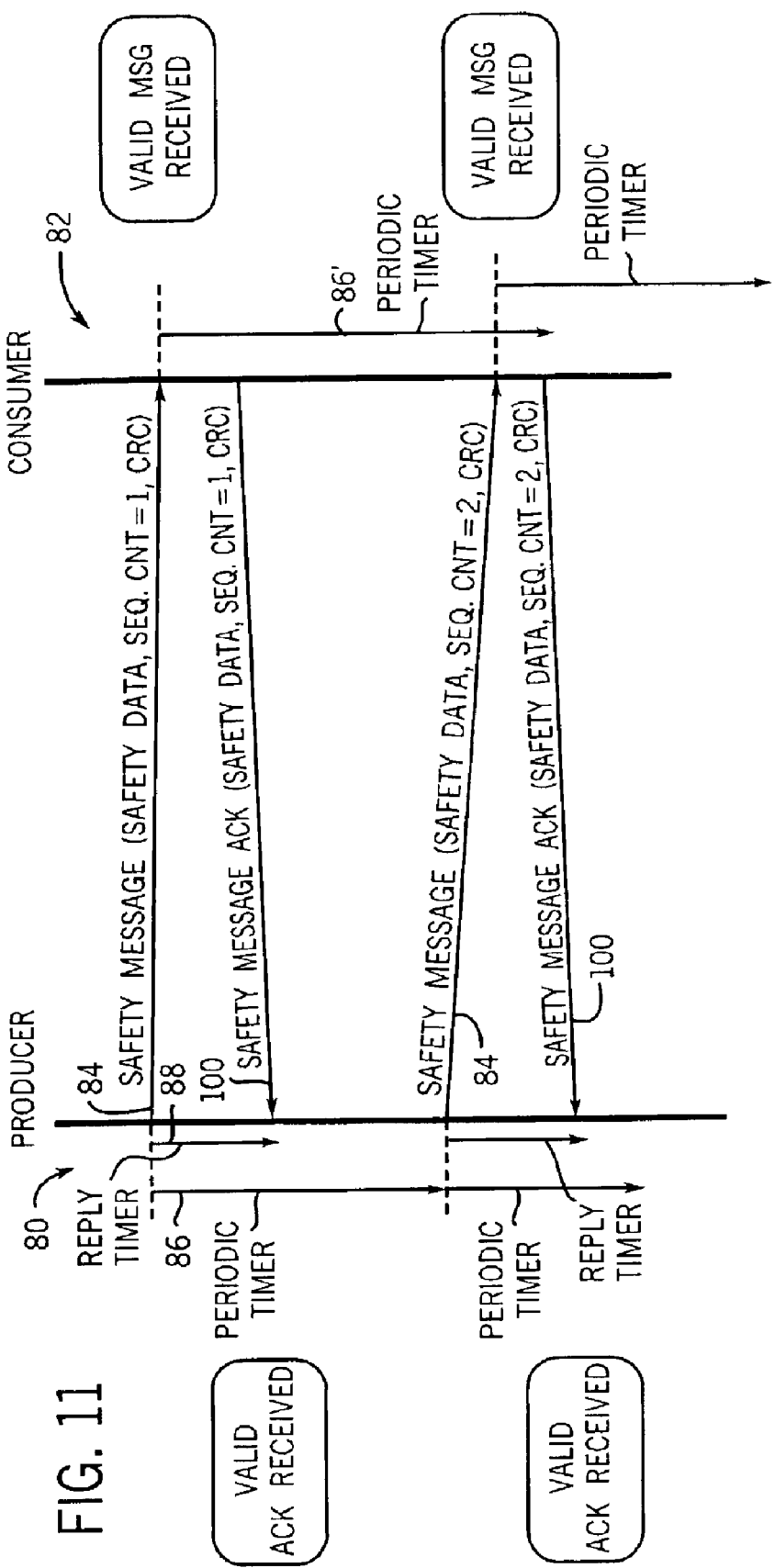
FIG. 11 is a figure similar to that of FIG. 7 showing normal protocol operation under the safety protocol of the present invention during run-time.

Referring generally to FIGS. 10 and 11, the message handling protocols 74 provide for message time measurements and respond to errors in the safety error detection data 58 during run-time. These message-handling protocols 74 are implemented in the safety protocol circuits 32, 40, and 46 or may be implemented in software and are different for producers and consumers.

Figure 17:
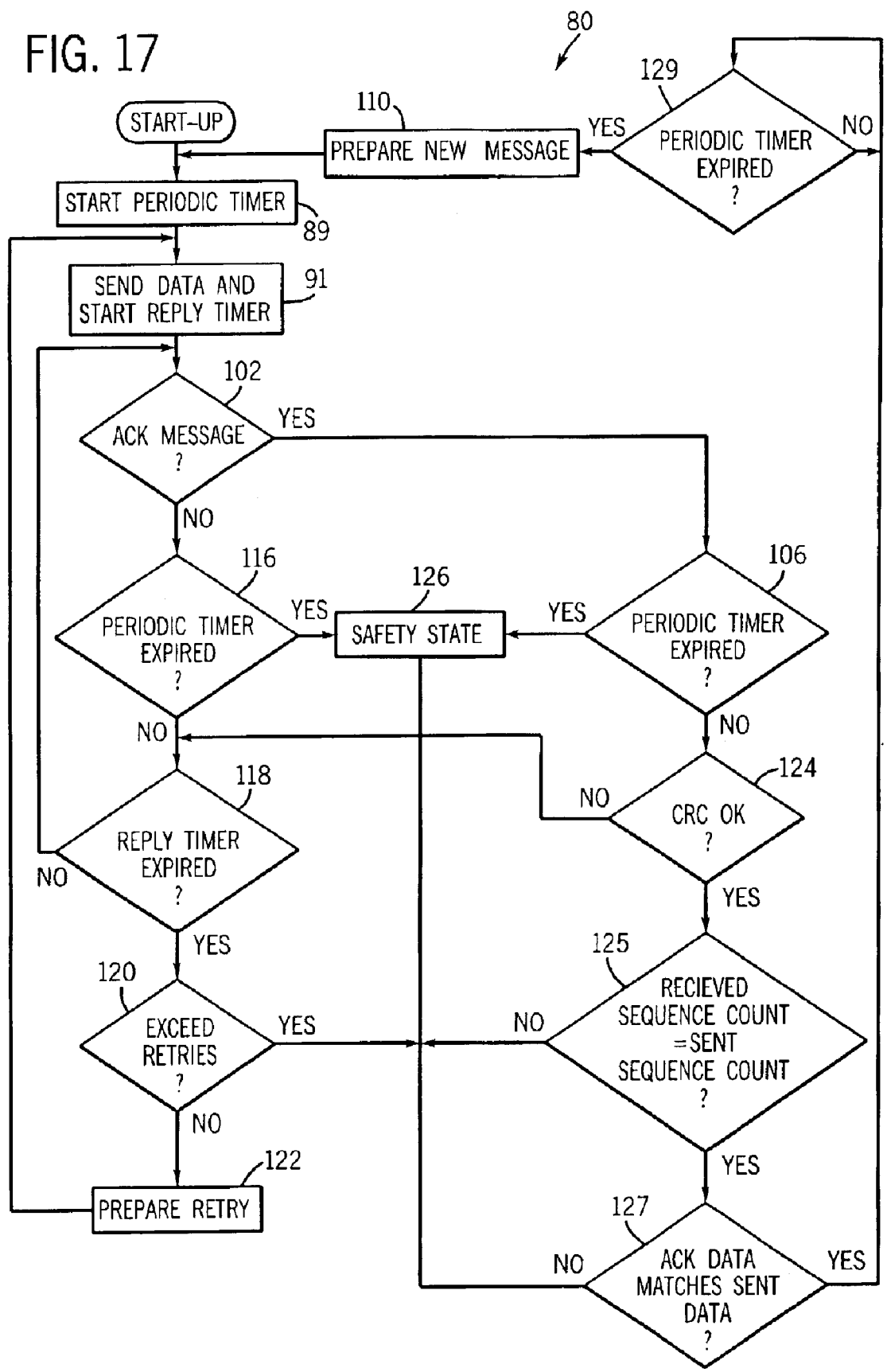
FIG. 17 is a flow chart of a program executed by the producers of FIG. 9 in implementing the safety protocol.

Referring now to FIGS. 11 and 17 for a normal, run-time transmission, the producer 80 upon run-time will send safety messages 84 (encapsulated in the standard network message 61 per safety message 60 as has been described above) to the consumer 82 per FIG. 11. This sending is indicated generally in FIG. 17. Optionally, immediately prior to sending the message 84, a periodic timer is started per process block 89 and a reply timer is started at the moment the message 84 is transmitted per process block 91. The periodic timer interval 86 is longer than the reply timer interval 88 as set in the configuration process described above. Generally, messages will be sent out at an expected packet rate equal to the periodic timer.

Figure 18:
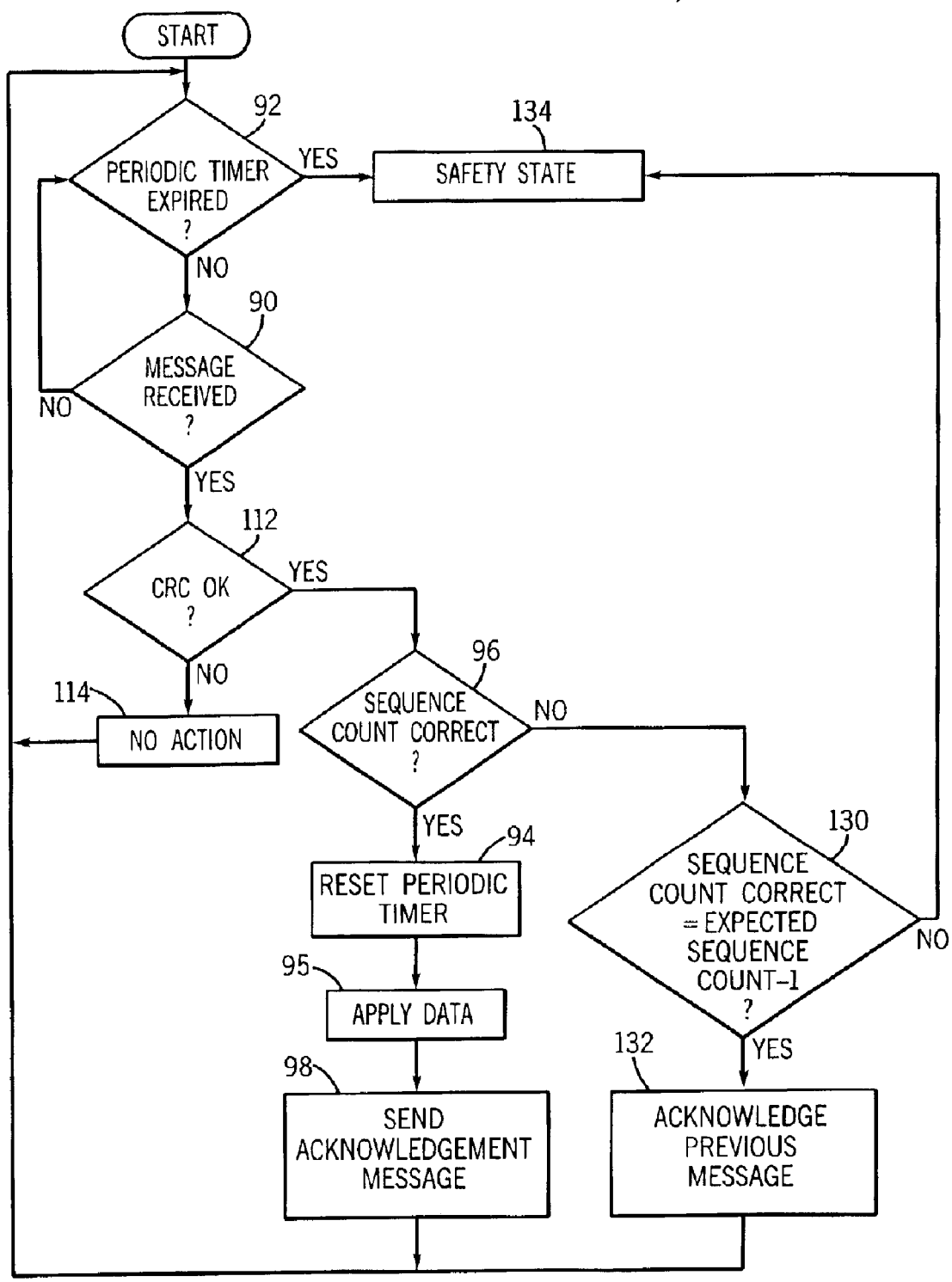
FIG. 18 is a flow chart of a program executed by the consumers of FIG. 9 in implementing the safety protocol of the present invention.

Referring now to FIGS. 9, 11 and 18, the consumer 82 prior to receiving the message 84 is continually checking to see if the periodic time interval 86' of its own periodic timer (started at the consumer's receipt of the last message 84) has expired as indicated in decision block 92. The periodic timer value 86' is generally greater than the periodic timer value 86.

If the periodic timer has expired, a failure is indicated and the program proceeds to process block 134, a safety state, as will be described below.

If timer value 86 has not expired, then at decision block 90, the consumer 82 checks to see if the message 84 has arrived. If no message 84 has arrived, the program proceeds back to decision block 92 to again check if the periodic timer 86 has expired.

Assuming that a message 84 has arrived prior to expiration of the periodic timer 86, then the program proceeds to decision block 112 to check the CRC of the message 84 and that the message destination per the SCCV matches the receiving device. In the event that two messages are sent, they may be compared at this point to see if: the data matches in the two messages, that there are two corresponding messages, and that the time stamp does not exceed a predetermined value. If the message is misdirected, that too may be determined at this point.

Assuming that the CRC is correct, the program proceeds to decision block 96 and checks to make sure that the sequence count (or alternatively the time stamp) is greater than the sequence count of the last message received.

If the sequence count is correct, then the program proceeds to process block 94 and the periodic timer 86 is reset. At process block 95, the data is applied, for example, to an output or to update variables, and then at process block 98, and optionally, an acknowledgement message 100 is returned to the producer 80.

Referring again to FIG. 17, the producer 80 receiving the acknowledge message at decision block 102, if such a message is elected and its data matches what was sent, proceeds to decision block 106 to determine if the periodic timer 86 has expired.

Assuming that the periodic timer has not expired, the program proceeds to decision block 124 to check the CRCs of the acknowledgement message 100. The cyclic redundancy code should match the data of the safety message 60 transmitted and the complementary data (when inverted) should match the safety data 52.

Again, assuming that the CRC and data are correct, the program proceeds to decision block 125 to determine whether the sequence count of the acknowledgment message 100 matches that of the message 84 that was sent.

If so, then at decision block 127, the data sent in message 84 is compared to the data of the acknowledgement message 100. If there is a match, then the program proceeds to decision block 129 where it loops until the periodic timer has expired, and then proceeds to process block 110 to prepare a new message 84.

This process is repeated for multiple transmissions of safety messages 84 and acknowledgement messages 100. Failure of any of the tests above may optionally cause the controller to enter the safety state.

(2) Message Received but Corrupted

Referring now to FIG. 11 in one potential error, the safety message 84 is corrupted, for example, by electromagnetic interference 85. In this case a message is received at the consumer 82, as indicated by FIG. 18 per process block 90, within the periodic timer value 86' as measured by process block 92, however, there is an error in the CRC data as determined by decision block 112. In this case, the program proceeds to process block 114 and no action is taken and in particular, no acknowledgement message 100 is returned. This latter condition will lead to a safety state being adopted if the periodic timer at the producer has expired. In this way, the sensitivity of the system to errors may be adjusted and moderated. In a similar way, a number of errors of a predetermined type, combination, or frequency may be used to trigger the safety state.

Referring to FIG. 17, in this case there will be no acknowledgment message 100 received by the producer 80 at process block 102. The program proceeds to decision block 116 to determine if the periodic time interval 86 has expired. If so, the failure is indicated and the program proceeds to the safety state of process block 126.

Figure 12:
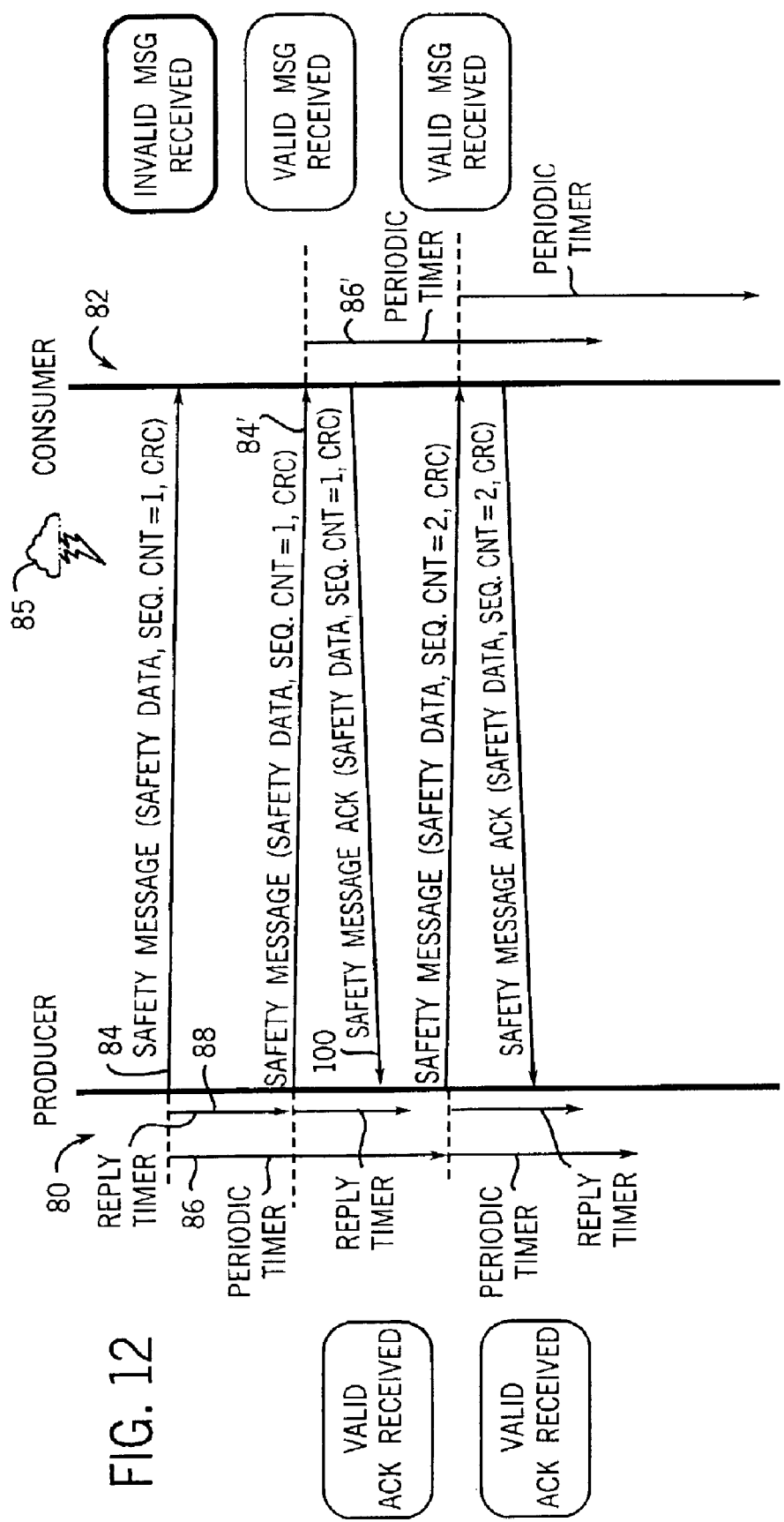
FIG. 12 is a figure similar to FIG. 11 showing protocol operation with a corrupted producer message.

Optionally, if the periodic timer interval 86 has not expired, the program will proceed to decision block 118 to see if the shorter reply timer interval 88 has expired. If not, the program will loop back to process block 102. If so, the program will proceed to process block 120 to check if the retry limit has been exceeded. Initially this may not be the case and the program will proceed to process block 122 and a repeat message 84' having the same sequence count will be sent at process block 84 as also indicated by FIG. 12. If the retry limit has been exceeded, the program proceeds to the safety state 126.

This repeat message 84' will be received at the consumer 82 as indicated by process block 90 of FIG. 18 and assuming that it is correct and that it has arrived within the periodic timer interval 86' based on the previous non-erroneous message, this message 84' results in the sending of an acknowledgment message 100 at process block 98 per the steps described above.

Typically, if only one missed transmission has occurred, the acknowledgment message 100 will occur within the periodic timer interval 86 of the producer and messages will continue to be exchanged normally as has been previously described with respect to FIG. 11.

(3) Message Not Received

Figure 13:
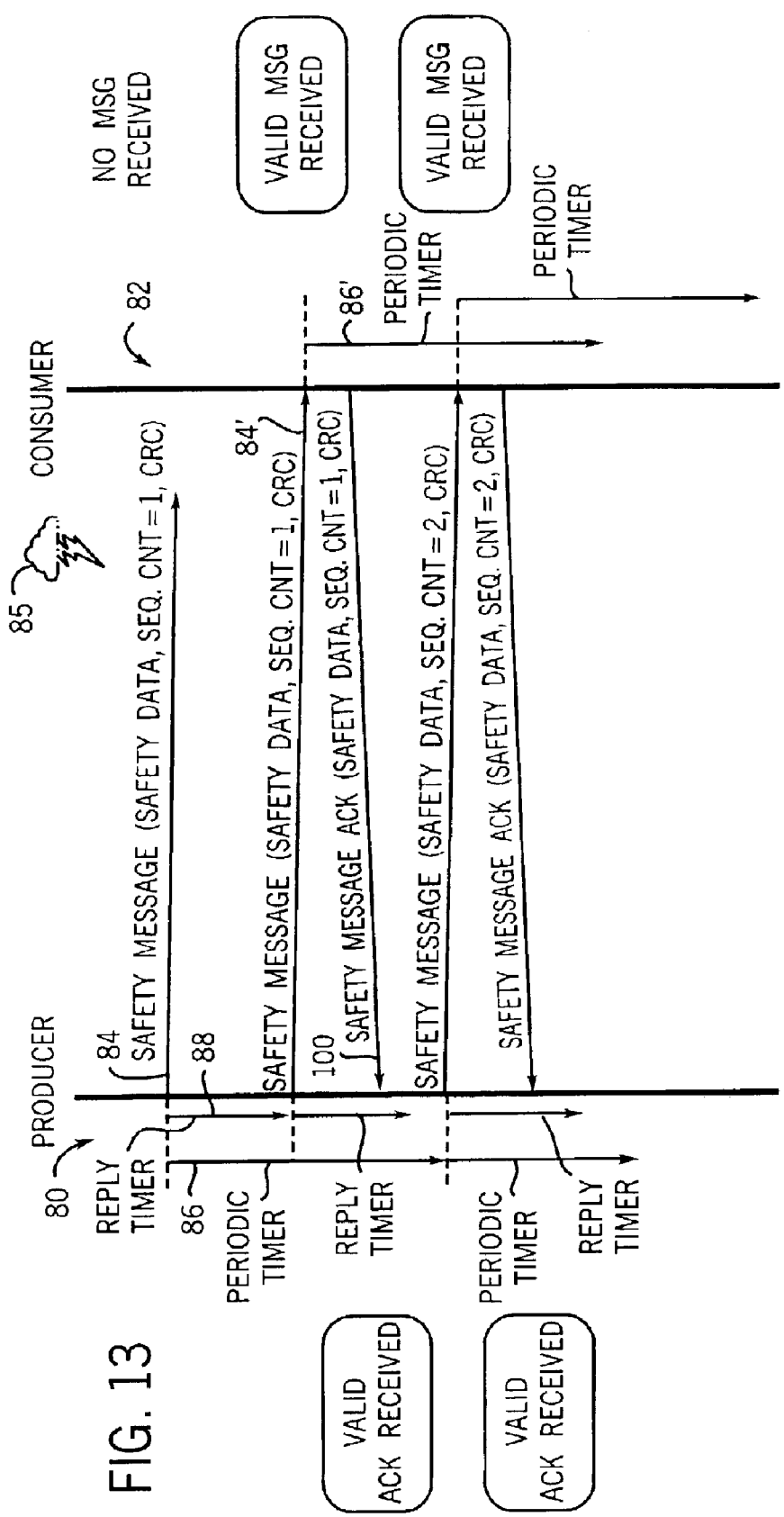
FIG. 13 is a figure similar to FIG. 11 showing protocol operation with a lost producer message.

Referring now to FIG. 13, in the previous example, the safety message 84 arrived at the consumer 82 to be detected, albeit with errors. It is possible that the safety message 84 will not arrive at the consumer 82, either as a result of such extreme interference that it is not recognizable as a message under low-level network protocols, or as a result of component failures between the producer and the consumer of an intermittent nature. Under this situation, the producer 80 sends the message 84 but the consumer does not receive a message at process block 90 of FIG. 18.

The "no action" block 114 of FIG. 18 of the consumer (as described above) is thus not encountered but the result is in any case the same: the consumer 82 takes no action.

Thus, as described previously with respect to FIG. 12 at the expiration of the reply timer at the producer 80, the producer 80 will produce a second message 84' which if received will result in an acknowledgment message 100 initiating a string of normal communications.

(4) Acknowledgment Message Received but Corrupted

Figure 14:
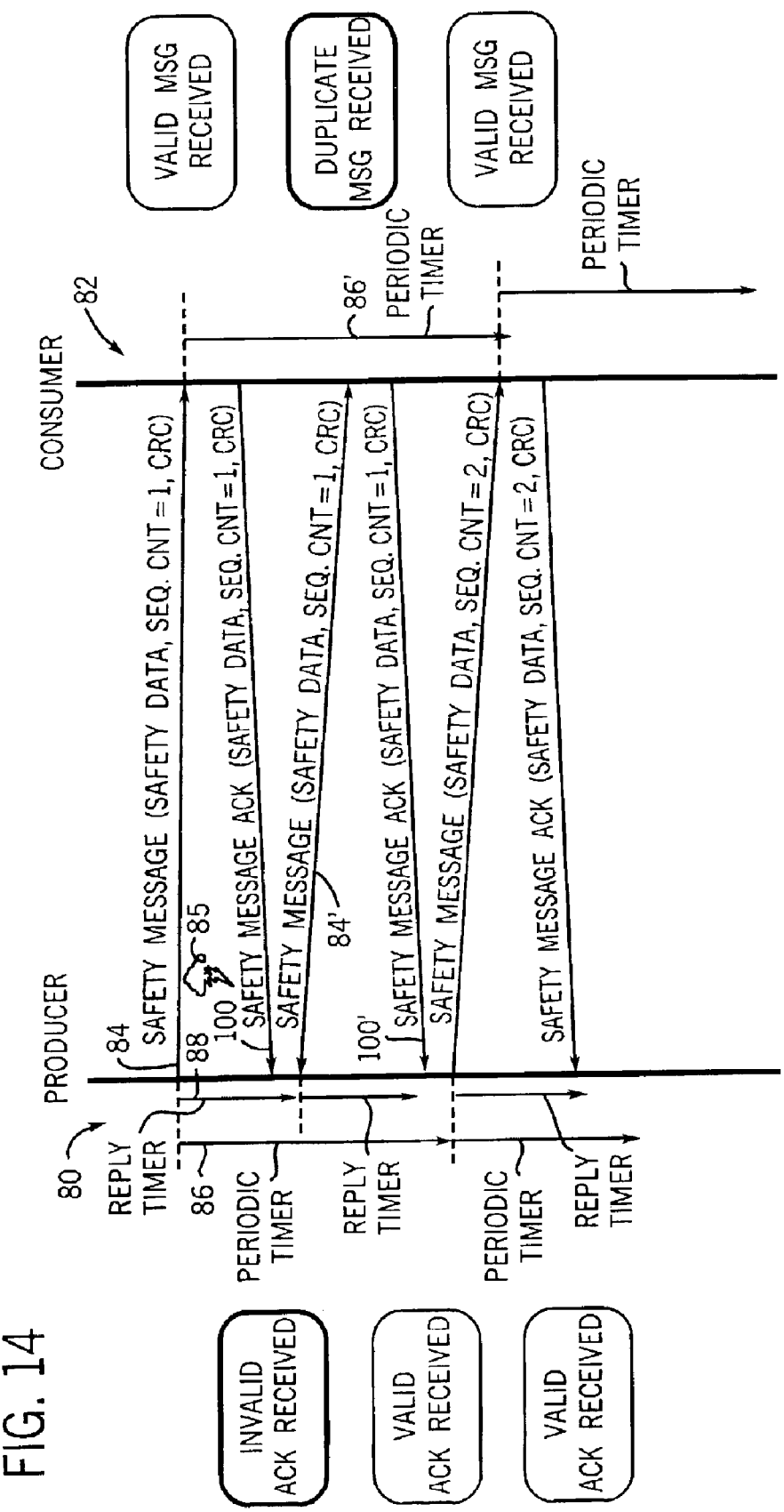
FIG. 14 is a figure similar to FIG. 11 showing protocol operation with a corrupted acknowledgement message from the consumer.

Referring now to FIG. 14 the safety message 84 may successfully reach the consumer 82 with no errors but the acknowledgement message 100 may have errors introduced by electromagnetic interference 85. In this case, the producer 80 reacts as shown in FIG. 17 by decision block 106 to detect a receipt of an acknowledgment message 100 within the periodic timer interval 86. But there is an error in the data of the acknowledgment message 100.

If the CRC is correct as determined by decision block 124 and it is the sequence count that is wrong per process block 124, then the program enters the safety state 126 in which outputs and inputs of the consumer 82 are set to a predefined safety state of the configuration data. The predefined safety state, as was previously provided as part of the configuration data defines that state (outputs and internal state) to which the device will revert in the case of network error. The safety state may be communicated with the list of related I/O points indicating other I/O points (related to other connections), which should revert to the safety state if the present connection has an error. This list was also provided as part of the configuration data described above. The safety state and list of related I/O points may be designated by the system programmer based on the particular application of the control system and states and related groupings of devices that will best provide for failure of individual devices or connections.

Similarly, if the sequence count is correct but the acknowledgement data does not match per decision block 127, the program proceeds to the safety state 126. If the consumer 82 is the controller 12 messages may be sent to other I/O devices, indicated in the configuration data signaling them to move to the safety state as well.

Assuming at process block 124 that the CRC code does not match the safety message 60, indicating a corruption in the safety message rather than an erroneous duplicate message, the program proceeds to decision block 118 to see if the reply timer has expired as described above. When the reply timer expires, the program proceeds to process block 120 as described above and checks the retry counter to see if the retry limit has been exceeded. If so, the program proceeds to the safety state 126, however, often this will not have occurred and the program proceeds to process block 122 and a retry message 84' is prepared as indicated in FIG. 14.

Assuming this retry message evokes a non-corrupted acknowledgment message 100' communication continues in normal fashion.

(5) Acknowledgment Message Not Received

Figure 15:
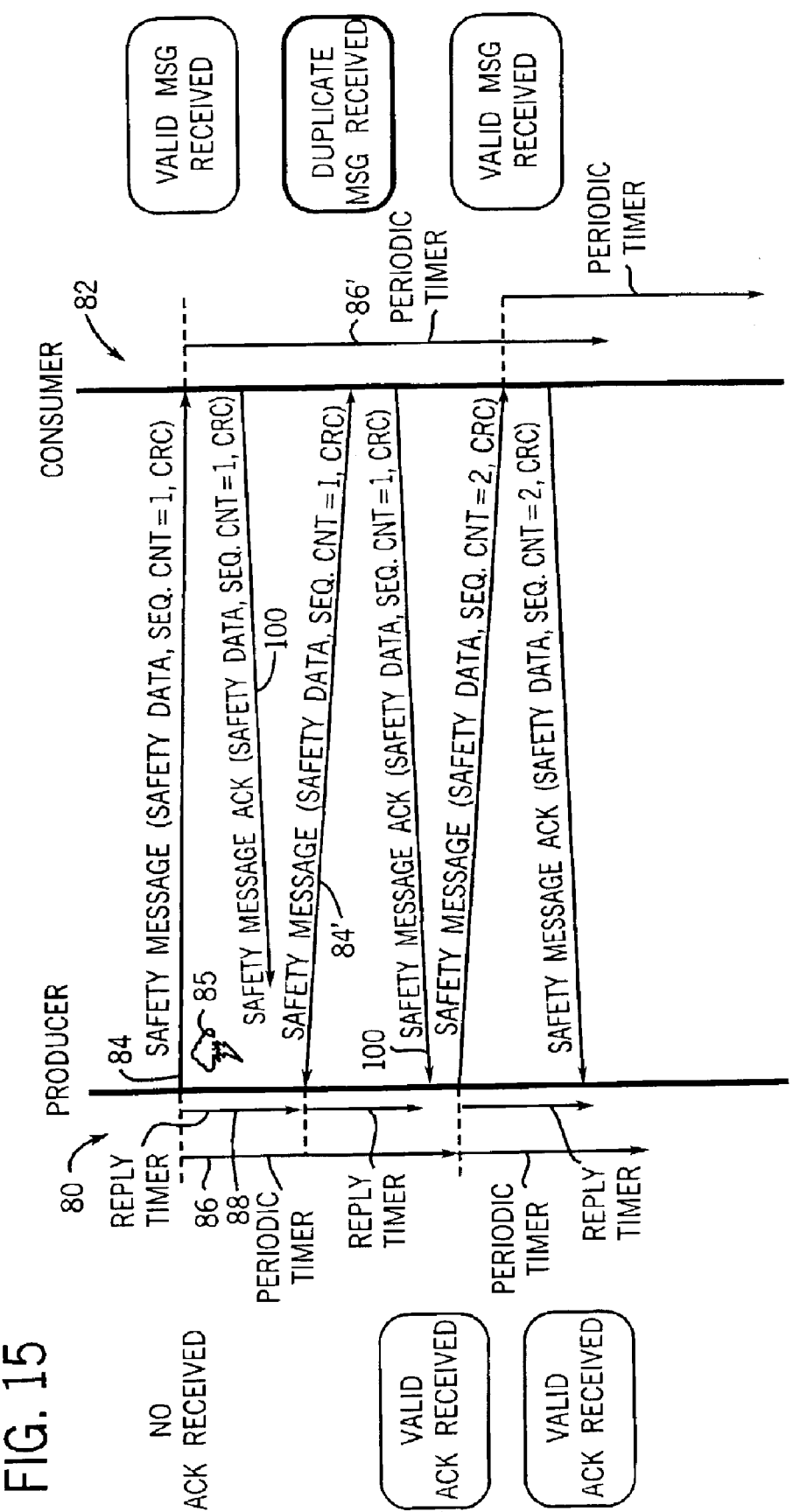
FIG. 15 is a figure similar to FIG. 11 showing protocol operation with a lost consumer acknowledgement message.
Figure 16:
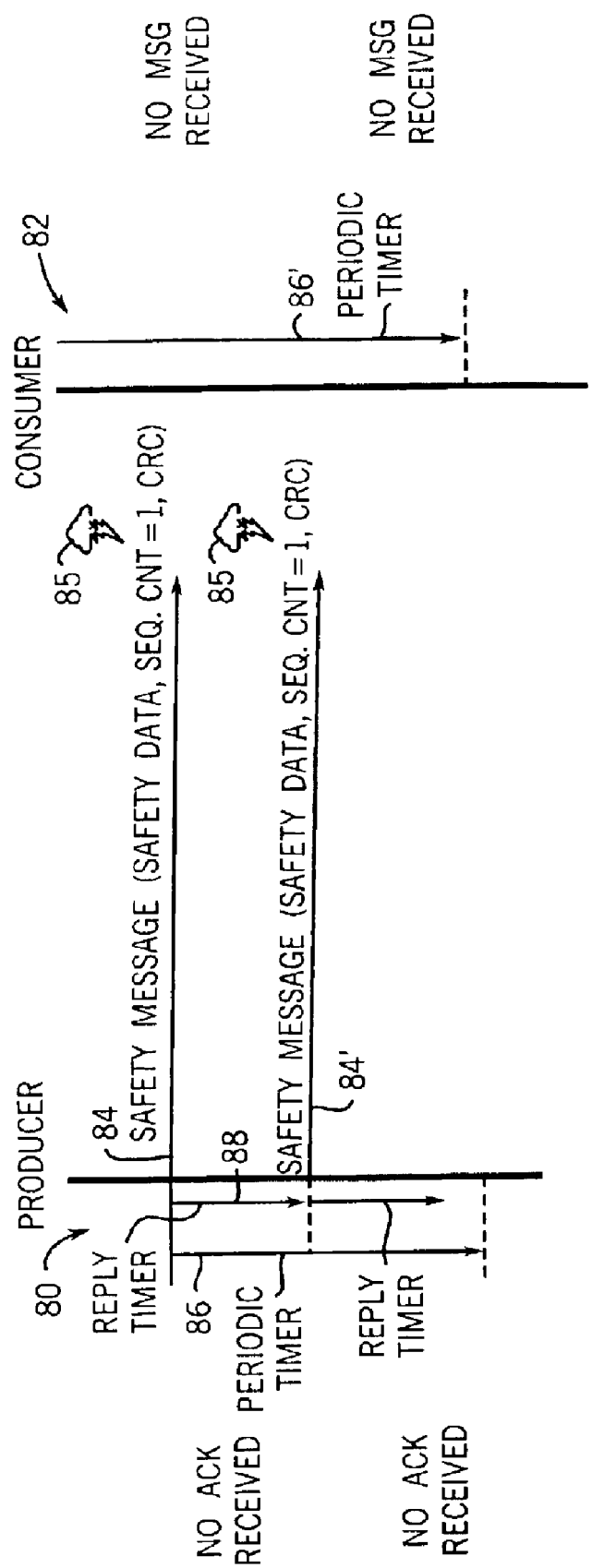
FIG. 16 is a figure similar to FIG. 11 showing protocol operation with disruption of the connection between the producer and consumer.

Referring now to FIG. 15, it is possible that the acknowledgment message 100 is lost completely either through interference or temporary communication failure. In that case as has been previously described, a duplicate message 84 will be sent from the producer 80, however, the sequence count will be identical to the sequence count of a message 84 previously received by the consumer 82. In this case, as shown in FIG. 18 at process block 112, the CRC will be correct but as tested at subsequent decision block 96 the sequence code will be wrong. The program, in this case, proceeds to process block 130 to check if the sequence code is one less than that expected. If not, the program proceeds to the safety state 134. If so, however, the consumer 82 must conclude that the acknowledgment message 100 was lost and an acknowledgment of the previous message is sent again by the consumer at process block 132.

(6) No Messages Received

Finally as shown in FIG. 15, the producer may be unable to connect with the consumer within the periodic interval 86' of the consumer. In that case, the program proceeds to the safety state 134 directly from decision block 92 as shown in FIG. 18.

The above description has been that of a preferred embodiment of the present invention, it will occur to those that practice the art that many modifications may be made without departing from the spirit and scope of the invention. In order to apprise the public of the various embodiments that may fall within the scope of the invention, the following claims are made.

We claim:

1. A backplane system for interconnecting components of an industrial controller for safety operation comprising:
   (a) a backplane having at least one conductor for conducting data as digital messages;
   (b) at least two industrial controller components having connectors allowing connection of the industrial components to the conductor of the backplane for the communication of messages thereon;
   (c) a safety protocol means enforcing a communications protocol on messages communicated over the backplane among industrial controller components to provide an error indication upon any of:
      (i) loss of a message transmitted from one component to a second component;
      (ii) corruption of a message transmitted from one component to a second component; and
      (iii) misdirection of a message transmitted from one component, intended for a second component, to a third component;
   (d) the safety protocol means places the industrial controller in a predetermined safety state upon a predetermined error indication.

2. The backplane system of claim 1 wherein the safety means detects loss of a message using a protocol selected from the group consisting of:
   (a) sending multiple messages and detecting the arrival of less than all,
   (b) sending messages on a predetermined schedule and detecting failure of messages to arrive according to the schedule,
   (c) providing that the second component acknowledge messages and detecting failure of acknowledgement.

3. The backplane system of claim 1 wherein the safety means detects corruption of a message using a protocol selected from the group consisting of:
   (a) sending multiple messages and detecting a failure of the messages to match,
   (b) sending messages with error correction codes, and
   (c) providing that the second component acknowledge messages with a copy of the original message and comparing the two.

4. The backplane system of claim 1 wherein the safety means detects misdirection of a message using a protocol selected from the group consisting of:
   (a) embedding in each message an identifier of the intended recipient and comparing that at the second component to the identifier of the second component,
   (b) embedding in each message a message sequence number and comparing that at the second component to the message sequence number of the previously received message,
   (c) responding to errors detected at other components resulting from loss of a message at those components.

5. The backplane system of claim 1 wherein the safety protocol further provides an indication of:
   (iv) repetition of a message previously transmitted from one component to a second component;
   (v) insertion of a message not transmitted from any component to a second component; and
   (vi) a change in sequence of multiple messages transmitted from a first component before receipt by a second component.

6. The backplane system of claim 5 wherein the safety means detects repetition of a message using a protocol selected from the group consisting of:
   (a) embedding in each message a time stamp of the time of transmission on the backplane and comparing that at the second component to the time stamps of all messages for duplication, and
   (b) embedding in each message, a message sequence number and comparing that at the second component to the message sequence number of the previously received message.

7. The backplane system of claim 5 wherein the safety means detects insertion of a message using a protocol selected from the group consisting of:
   (a) embedding in each message, a time stamp of the time of transmission on the backplane and comparing that at the second component to the time stamps of all messages for duplication,
   (b) embedding in each message a message sequence number and comparing that at the second component to the message sequence number of the previously received message,
   (c) embedding in each message, an identifier of the intended recipient and comparing that at the second component to the identifier of the second component.

8. The backplane system of claim 5 wherein the safety means detects a change in sequence of a message using a protocol selected from the group consisting of:
   (a) embedding in each message, a time stamp of the time of transmission on the backplane and comparing that at the second component, to the time stamps of all messages for duplication,
   (b) embedding in each message, a message sequence number and comparing that at the second component to the message sequence number of the previously received message.

9. The backplane system of claim 1 wherein the safety means is implemented in hardware.

10. The backplane system of claim 1 wherein the safety means is implemented in software.

11. The backplane system of claim 1 wherein the safety means provides an undetected error rate less than $10^{-7}$ per hour.

12. The backplane system of claim 1 wherein the predetermined error indication is a function of type of error indication and number of error indications.

13. The backplane system of claim 1 wherein the predetermined error indication of the backplane uses a standard network protocol.

14. The backplane system of claim 13 wherein the predetermined error indication uses a standard network protocol selected from the group consisting of: DeviceNet and ControlNet, Ethernet, and ATM.

15. A backplane system for interconnecting components of an industrial controller for safety operation comprising:
   (a) an input component providing redundant input signals on a first and second dedicated wire conductor;
   (b) an output component receiving redundant output signals on a first and second dedicated wire conductor;
   (d) a backplane having at least one conductor for conducting data as digital messages;
   (e) at least two industrial controller components having connectors allowing connection of the industrial components to the conductor of the backplane and having terminals connectable to receive the redundant signals of the input and output devices on the dedicated wire conductors and to communicate between the input and output devices using at least one message for each set of redundant signals; and (f) a safety protocol means enforcing a communications protocol on messages communicated over the backplane among industrial controller components to provide an error rate in the transmission of messages between the input device and output device using the backplane no greater than the error rate obtained by direct connection of the dedicated wire conductors of the input and output components directly between the input and output components.

16. The backplane system of claim 15 wherein the industrial controller components communicate between the input and output devices using only one message for each set of redundant signals.

17. A backplane system for interconnecting components of an industrial controller for safety operation comprising:

(a) a switch providing redundant contacts connectable to wires;

(b) an output device providing redundant inputs connectable to wires;

(c) a backplane having at least one conductor for conducting data as digital messages;

(d) at least two industrial controller components having connectors allowing connection of the industrial components to the conductor of the backplane and having terminals connectable to wires of the switch and output device, the industrial controller components providing an interface between the terminals and the backplane allowing for the communication of a signal from the switch to a first industrial controller component through the backplane to a second industrial controller component to the output device; and (e) a safety protocol means enforcing a communications protocol on messages communicated over the backplane among industrial controller components to provide an error rate in the transmission of messages between the switch and output device using the backplane no greater than the error rate obtained by direct wire connection between the switch and output device.

18. A method of interconnecting components of an industrial controller for safety operation comprising the steps of:

(a) communicating messages over a backplane having at least one conductor for conducting data as digital messages between at least two industrial controller components having connectors allowing connection of the industrial components to the conductor of the backplane for the communication of messages;

(b) enforcing a safety protocol in the transmission of the messages to provide an error indication upon any of:

(i) loss of a message transmitted from one component to a second component;

(ii) corruption of a message transmitted from one component to a second component; and (iii) misdirection of a message transmitted from one component, intended for a second component, to a third component; and (c) placing the industrial controller in a predetermined safety state upon a predetermined error indication.

19. The method of claim 18 wherein the safety protocol detects loss of a message using a step selected from the group consisting of:

(a) sending multiple messages and detecting the arrival of less than all, (b) sending messages on a predetermined schedule and detecting failure of messages to arrive according to the schedule; and (c) providing that the second component acknowledges messages and detects failure of acknowledgement.

20. The method of claim 18 wherein the safety protocol detects corruption of a message using a step selected from the group consisting of:

(a) sending multiple messages and detecting a failure of the messages to match, (b) sending messages with error correction codes, and (c) providing that the second component acknowledge messages with a copy of the original message and comparing the two.

21. The method of claim 18 wherein the safety protocol detects misdirection of a message using a protocol selected from the group consisting of:

(a) embedding in each message, an identifier of the intended recipient and comparing that at the second component to the identifier of the second component, (b) embedding in each message, a message sequence number and comparing that at the second component to the message sequence number of the previously received message, (c) responding to errors detected at other components resulting from loss of a message at those components.

22. The method of claim 18 wherein the safety protocol further provides an indication of:

(iv) repetition of a message previously transmitted from one component to a second component;

(v) insertion of a message not transmitted from any component to a second component; and (vi) a change in sequence of multiple messages transmitted from a first component before receipt by a second component.

23. The method of claim 22 wherein the safety protocol detects repetition of a message using a step selected from the group consisting of:

(a) embedding in each message a time stamp of the time of transmission on the backplane and comparing that at the second component to the time stamps of all messages for duplication, (b) embedding in each message a message sequence number and comparing that at the second component to the message sequence number of the previously received message.

24. The method of claim 22 wherein the safety protocol detects insertion of a message using a step selected from the group consisting of:

(a) embedding in each message, a time stamp of the time of transmission on the backplane and comparing that at the second component, the time stamps of all messages for duplication;

(b) embedding in each message, a message sequence number and comparing that at the second component to the message sequence number of the previously received message; and (c) embedding in each message, an identifier of the intended recipient and comparing that at the second component to the identifier of the second component.

25. The method of claim 22 wherein the safety protocol detects a change in sequence of a message using a protocol selected from the group consisting of:

(a) embedding in each message, a time stamp of the time of transmission on the backplane and comparing that at the second component to the time stamps of all messages for duplication, (b) embedding in each message, a message sequence number and comparing that at the second component to the message sequence number of the previously received message.

26. The method of claim 18 wherein the safety protocol provides an undetected error rate less than $10^{-7}$ per hour.

27. The method of claim 18 wherein the predetermined error indication is a function type of error indication and number of error indications.

28. A method of interconnecting components of an industrial controller for safety operation including an input component providing redundant input signals on a first and second dedicated wire conductor;

an output component receiving redundant output signals on a first and second dedicated wire conductor;

a backplane having at least one conductor for conducting data as digital messages; and at least two industrial controller components having connectors allowing connection of the industrial components to the conductor of the backplane and having terminals connectable to receive the redundant signals of the input and output devices on the dedicated wire conductors and to communicate between the input and output devices using at least one message for each set of redundant signals;

comprising the steps of:

enforcing a safety protocol on messages communicated over the backplane among industrial controller components to provide an error rate in the transmission of messages between the input device and output device using the backplane no greater than the error rate obtained by direct connection of the dedicated wire conductors of the input and output components directly between the input and output components.

29. The method of claim 28 wherein the industrial controller components communicate between the input and output devices using only one message for each set of redundant signals.

30. A method of interconnecting components of an industrial controller for safety operation including:

a switch providing redundant contacts connectable to wires; an output device providing redundant inputs connectable to wires;

a backplane having at least one conductor for conducting data as digital messages;

at least two industrial controller components having connectors allowing connection of the industrial components to the conductor of the backplane and having terminals connectable to wires of the switch and output device, the industrial controller components providing an interface between the terminals and the backplane allowing for the communication of a signal from the switch to a first industrial controller component through the backplane to a second industrial controller component to the output device;

the method comprising the steps of:

enforcing a safety protocol on messages communicated over the backplane among industrial controller components to provide an error rate in the transmission of messages between the switch and output device using the backplane no greater than the error rate obtained by direct wire connection between the switch and output device.

* * * * *